United States Patent
Levandoski

(10) Patent No.: US 6,676,795 B1
(45) Date of Patent: Jan. 13, 2004

(54) BONDED ASSEMBLY AND METHOD FOR PREPARING SAME

(75) Inventor: Susan Levandoski, Bristol, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 205 days.

(21) Appl. No.: 09/916,293

(22) Filed: Jul. 30, 2001

(51) Int. Cl.[7] ................................ B32B 31/28
(52) U.S. Cl. ................ 156/272.2; 156/275.5; 156/275.7; 156/325; 101/167
(58) Field of Search ............ 156/272.2, 275.5, 156/275.7, 325; 347/53; 522/1; 101/155, 167

(56) References Cited

U.S. PATENT DOCUMENTS

| | | | |
|---|---|---|---|
| 3,218,305 A | 11/1965 | Krieble | 260/89.5 |
| 4,180,640 A | 12/1979 | Melody et al. | 526/323.1 |
| 4,287,330 A | 9/1981 | Rich | 526/270 |
| 4,309,526 A * | 1/1982 | Baccei | 528/75 |
| 4,321,349 A | 3/1982 | Rich | 526/270 |
| 5,824,385 A * | 10/1998 | Itoigawa et al. | 428/64.1 |
| 6,460,464 B1 * | 10/2002 | Attarwala | 102/469 |
| 2003/0060588 A1 * | 3/2003 | Jacobine et al. | 528/44 |

FOREIGN PATENT DOCUMENTS

| | | | |
|---|---|---|---|
| WO | WO 00/40663 | 7/2000 | C09J/4/00 |

* cited by examiner

Primary Examiner—Jeff H. Aftergut
Assistant Examiner—John T. Haran
(74) Attorney, Agent, or Firm—Steven C. Bauman

(57) ABSTRACT

A method of preparing a bonded assembly of two substrates at least one of which is transparent or translucent to UV or visible light, comprises a) applying, to at least one of the substrates, a photo/anaerobic dual cure composition comprising:
  i) a (meth)acrylate-capped urethane oligomer,
  ii) at least one (meth)acrylate diluent monomer,
  iii) an anaerobic curing system, and
  iv) a free-radical photoinitiator;
b) joining the two substrates
c) irradiating the adhesive through said transparent or translucent substrates with light of a wavelength effective to activate the photoinitiator for a time sufficient to at least fixture the adhesive, and then
d) allowing the assembly to further cure at ambient conditions without for at least 24 hrs without subjecting the fixtured assembly to substantial peel stresses.

24 Claims, 1 Drawing Sheet

US 6,676,795 B1

BONDED ASSEMBLY AND METHOD FOR PREPARING SAME

FIELD OF THE INVENTION

The invention relates to a bonded assembly, such as a metal/plastic wiper blade assembly, and to a method of preparing same.

BACKGROUND OF THE INVENTION

Wiper blades are used in a printer and copier products to clean surfaces, such as electrically charged drums. A typical design for such a structure utilizes a blade of a flexible plastic material, such as a reinforced polyurethane, which is mounted on a support, conventionally by bonding using a hot melt adhesive. Such hot melt adhesives have a fast setting time, which allows the assemblies to be produced rapidly and efficiently. However wiper blade assemblies are subjected to peel stresses in use and hot melt adhesives have not given entirely satisfactory peel performance in this application. Accordingly it would be desirable to have an adhesive system which gave improved peel strengths in use while preserving the benefits of an assembly technique adapted for high speed production. Desirably the system would provide adhesive set times of less than one minute, preferably about 30 seconds or less.

As alternatives to hot melt adhesives, a large variety of curable adhesives are known. Many such adhesives will yield good tensile strengths, but are ordinary at best resisting peel stresses. This peel stress resistance is a particular problem with fast curing systems, such as cyanoacrylate adhesives or acrylic systems activated with a primer. Primer activation is also undesirable for its added complexity.

Anaerobic and/or epoxy adhesives may provide high peel strengths, but typically require relatively long setting times.

Within the curable adhesive art it is known that adhesives based on acrylate monomers generally cure faster when exposed to UV irradiation and produce less rigid cured polymers than adhesives employing methacrylate monomers. Accordingly, although UV curing methacrylate-based adhesives are known, it is generally much preferred to use acrylates when fast cure and flexible cured properties are desired.

U.S. Pat. No. 4,309,526 (Baccei et al) describes unsaturated curable poly(alkylene)ether polyol based urethane resins which give flexible cured properties with both methacrylate and acrylate unsaturation. Compositions which cure by UV irradiation are described as well as compositions which cure anaerobically.

While the state-of-the-technology provides various adhesive solutions to a variety of application requirements, it is not believed that metal/plastic wiper blade assemblies, and the issues presented during manufacture thereof, have been adequately addressed prior to the invention described herein.

SUMMARY OF THE INVENTION

The inventors have discovered that wiper blade assemblies can be bonded with a urethane (meth)acrylate based adhesive which has been modified to provide both UV and anaerobic curing mechanisms. The adhesive provides both desired rapid setting time when irradiated through a transparent or translucent substrate, and desirable high peel strengths.

Accordingly, in one aspect the invention comprises a method of preparing a bonded assembly of two substrates at least one of which is transparent or translucent to UV or visible light, the method comprising a) applying, to at least one of the substrates, a photo/anaerobic dual cure composition comprising:
  i) a (meth)acrylate-capped urethane oligomer,
  ii) at least one (meth)acrylate diluent monomer,
  iii) an anaerobic curing system, and
  iv) a free-radical photoinitiator;
b) joining the two substrates
c) irradiating the adhesive through said transparent or translucent substrate with light of a wavelength effective to activate the photoinitiator for a time sufficient to at least fixture the adhesive, and then
d) allowing the assembly to further cure at ambient conditions without for at least 12 hrs without subjecting the fixtured assembly to substantial peel stresses.

Further aspects of the invention include the adhesive used in the inventive method and bonded assemblies prepared by the inventive method, especially such assemblies in which the transparent or translucent substrate is a flexible polyurethane. The inventive method can be used to prepare wiper blade assemblies with an assembly time as fast as a hot melt adhesive and yet to provide peel strengths in use which are substantially higher.

DETAILED DESCRIPTION OF THE INVENTION

Figure 1:
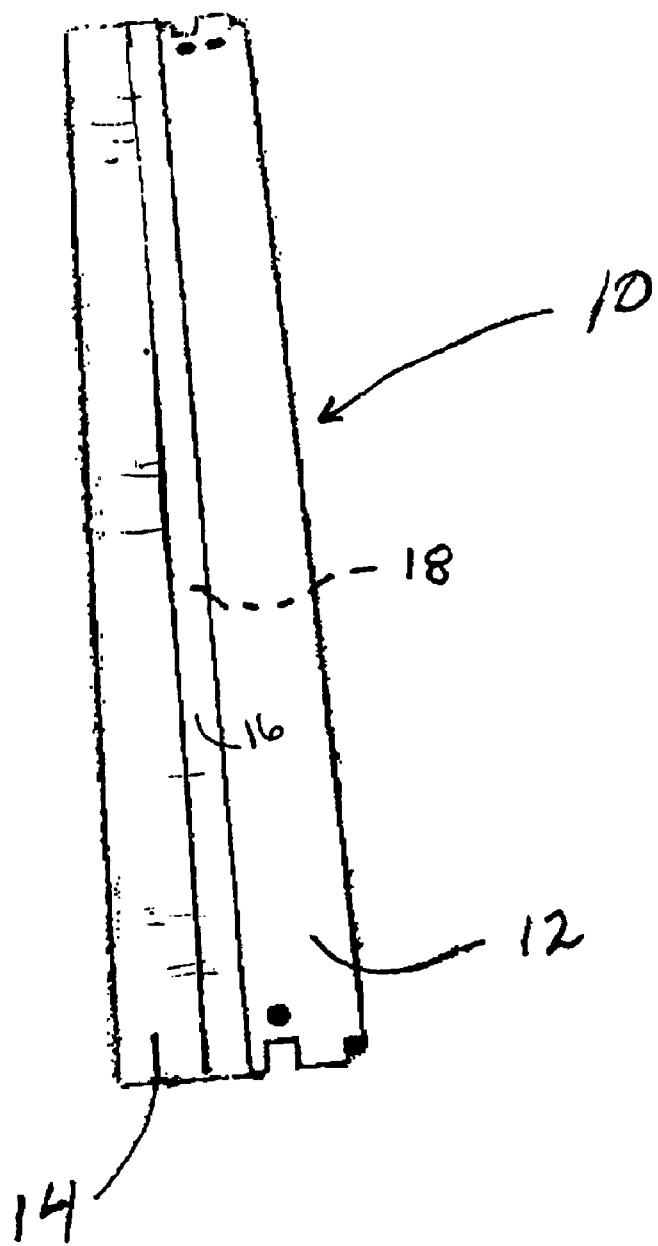
FIG. 1 shows a plan view of a bonded wiper blade assembly.

A reactive thermoset adhesive which bonds chemically with an object to be bonded is superior to a thermoplastic hot-melt adhesive in bonding strength, heat resistance and mechanical strength. When applied to the manufacture of wiper blades or other assemblies subjected to substantial peel stresses, reactive thermoset adhesives are capable of providing high quality assemblies which are highly reliable because of their excellent cured peel strengths.

The photo/anaerobic dual cure adhesive utilized in the invention includes as a first component at least one (meth)acrylate capped polyurethane oligomer. A variety of commercial urethane (meth)acrylate oligomer resins are known. Preferably, this component is, or includes, a block resin such as described in U.S. Pat. No. 4,309,526, comprising at least one polyether block derived from a polyether polyol and at least one hard block derived from an aromatic or cycloaliphatic diisocyanate and an aromatic or cycloaliphatic polyol. Especially preferred are such resins in which the polyether polyol is an aliphatic polyether having a number average molecular weight of from about 400 to about 10,000, more preferably about 700 to about 3,500. The (meth)acrylate capped polyurethane oligomer(s) are suitably employed in the compositions in amounts of 25–80%, desirably 30–50%, by weight of the composition.

The photo/anaerobic dual cure adhesive also includes a reactive monomer component which functions as a diluent for the oligomer component and cured property modifiers. Typically the reactive monomer component is a mixture of liquid ester monomers, preferably acrylate and methacrylate esters having a viscosity of 100–5,000 cps (100–5,000 mPa·s), preferably 100–4,000 cps (100–4,000 mPa·s), more preferably 100–2,000 cps 200–2,000 mPa·s). Suitably, such (meth)acrylate monomers include relative low molecular weight mono, di, or poly(meth)acrylate compounds, examples of which are β-carboxyethyl acrylate, isobornyl acrylate, n-octyl acrylate, n-decyl acrylate, cyclohexyl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl acrylate, isooctyl acrylate, n-butyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, phenoxyethyl acrylate, hydroxyethyl methacrylate, hydroxypropyl methacrylate, cyclohexyl methacrylate, glycerol mono-methacrylate, glycerol 1,3-dimethacrylate, trimethyl cyclohexyl methacrylate, methyl triglycol methacrylate, isobornyl methacrylate trimethylolpropane trimethacrylate, neopentyl glycol dimethacrylate, ethylene glycol dimethacrylate, diethylene glycol dimethacrylate, 1,6- hexanediol dimethacrylate, hydroxybutyl methacrylate, tetrahydrofurfuryl methacrylate, cyclohexyl methacrylate, phenoxyethyl methacrylate, and so forth. Some of these monomers may be found as viscosity or property modifiers in the commercial oligomer products. Hydroxyalkyl (meth)acrylate monomers are particularly desirable. Preferred diluents include hydroxyethyl acrylate, hydroxypropyl acrylate, hydroxyethyl methacrylate, hydroxypropyl methacrylate, isobornyl methacrylate, and mixtures thereof.

The diluent monomers are employed in an amount of about 10% to about 60% by weight of the composition, more suitably from about 20% to about 50% by weight of the composition.

Surprisingly, despite exposure to radiation in the electromagnetic spectum through one of the substrates, formulations based entirely on (meth) acrylate monomers and oligomers give good UV setting times and excellent fully cured peel strengths.

Various adhesion promoters may be used in the curable formulations of the invention, particularly where the formulation is intended as an adhesive or coating. Adhesion promoters may include acid functional monomers such as acrylic acid or methacrylic acid, and silane adhesion promoters such as glycidoxypropyltrimethoxysilane, methacryloxypropyltrimethoxysilane, methacryloxypropyltriacetoxysilane, and acryloxypropyltrimethoxysilane, and various unsaturated nitrogen-containing compounds such as N,N'-dimethylacrylamide, acryloyl morpholine, and the adhesion promoters described in International Patent Publication No. WO 00/40663, for instance N-methyl-N-vinyl acetamide, N-vinyl caprolactam, N-vinylphthalimide, Uracil, and N-vinylpyrrolidone. Adhesion promoters may be used alone or in combination. The adhesion promoter or promoters may suitably be employed in the adhesive formulations of the invention in an amount from about 0.5% to about 30% by weight of the composition, more typically 1% to about 20% by weight, and particularly about 2% to about 10% by weight.

A free radical photoinitiator component is included in the formulation. The photoinitiators are active in the UV/visible range, approximately 250–850 nm, or some segment thereof. Examples of photoinitiators, which initiate under a free radical mechanism, include benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphosphonates, ketosulfides, dibenzoyldisulphides, diphenyldithiocarbonate and diphenyl(2,4,6-trimethylbenzoyl) phosphine oxide. The photoinitiators that may be used in the adhesive compositions of the present invention include photoiniiators available commercially from Ciba Specialty Chemicals, Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino- 1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl phosphine oxide and 2-hydroxy-2-methyl-1-phenyl-propan-1-one) and "DAROCUR" 1173 (2-hydroxy-2-methyl-1- phenyl-1-propane) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Photoinitiators particularly suitable for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173) and the ultraviolet/visible photoinitiator combination of bis(2,6-dimethoxybenzoyl-2,4,4-trimethylpentyl)phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC). LUCIRIN TPO, from BASF is another preferred photoinitiator. Typically, the photoinitiators will be employed in an amount of 0.3 to 7%, desirably 0.5 to 5% by weight of the composition.

The curable formulations of the present invention also include an anaerobic cure-inducing composition. Such an anaerobic cure-inducing composition useful in the present invention includes a variety of components, such as curing agents, accelerators and stabilizers. Typical curing agents are hydroperoxides, for example, t-butyl hydroperoxide, p-methane hydroperoxide, cumene hydroperoxide, diisopropylbenzene hydroperoxide, and the like. Typical accelerators include amines, amine oxides, sulfonamides, metal sources, acids and/or triazines, for example, ethanol amine, diethanol amine, triethanol amine, N,N dimethyl aniline, benzene sulphanimide, cyclohexyl amine, triethyl arnine, butyl amine, saccharin, N,N-diethyl-p-toluidine, N,N-dimethyl-o-toluidine, acetyl phenylhydrazine, maleic acid and the like. As stabilizers, quinones, such as benzoquinone, naphthoquinone and anthraquinone, as well as hydroquinone, methoxyhydroquinone and butylated hydroxy toluene may be mentioned as well as metal chelators such as EDTA or a salt thereof. Of course, other materials known to induce anaerobic cure may also be included or substituted therefor. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Referring now to FIG. 1, there is shown there a bonded wiper blade assembly 10 produced in accordance with the invention. Wiper blade assembly 10 includes a coated steel support member 12 and a blade member 14 made of a flexible durable polymer material, suitably a silica filled polyurethane. The blade member has a cloudy translucent appearance so that through bonded portion 16 thereof the underlying corresponding portion 18 of the support member 12 can be seen. Between portions 16 and 18 is a thin layer of cured adhesive in accordance with the invention.

Prior to assembly, the inner facing surface of the blade portion 16 is suitably solvent washed or ground to remove contaminants such as mold releases or the like which may be present. A film or bead of the curable adhesive is applied to one of both of the substrates on the facing surface of a portion 16 and/or 18. The two substrates are then joined overlapingly as shown and the adhesive is initially cured by irradiation. Suitably irradiation is for a period of time of about a minute or less using a mercury lamp providing a broad spectrum output with an intensity, measured at 365 nm, of about 40–600 mW/cm². Within such time the adhesive substantially cures. However, due to the secondary anaerobic cure, the compositions of the invention continue to strengthen so that full strength are typically not reached for 0.5–7 days after irradiation. During such time the assemblies may be handled, including assembly into a machine such as a copier or printer, but preferably they are not subjected to the full peel stresses encountered in operation of such machine.

The invention is illustrated by the following non-limiting examples.

EXAMPLES

Example 1

A block resin is prepared substantially in accordance with Example 6 of U.S. Pat. No. 4,309,526, except that the added diluent monomer used was isobornyl methacrylate instead of triethylene glycol dimethacrylate. The reaction product was used to formulate a stock solution to which other components were added to formulate a photo/anaerobic dual cure formulation of the invention, identified below in Table 1 as Formulation 1. In Table 1, Formulation 1, the diluent monomers, including any unreacted capping agent, are listed separately, i.e. they are not included in the weight reported for the block resin.

Comparative formulations A and B only employ a UV cure system. Comparative formulation A was prepared using commercial urethane acrylate oligomers specifically sold for UV cure formulations and monoacrylate monomers well known for fast UV cures. In this formulation the commercial resin is reported, as is, so that any diluent monomers included in the commercial oligomer are not separately reported.

Comparative Formulation B utilized the same resin and UV cure system as invention Formulation 1, but without the anaerobic cure system. It was formulated in the same manner as Invention Formulation 1.

TABLE 1

| Components/formulations | A | B | 1 |
|---|---|---|---|
| Urethane (meth)acrylate oligomer | | | |
| BR 582E urethane acrylate | 33.20 | | |
| PHOTOMER 6008 urethane acrylate | 11.10 | | |
| Example 1 Block Resin | | 35.50 | 29.85 |
| Mono (meth)acrylic monomers | | | |
| Hydroxyethyl methacrylate | — | 42.51 | 50.25 |
| Hydroxypropyl methacrylate | — | 5.16 | 4.34 |

TABLE 1-continued

| Components/formulations | A | B | 1 |
|---|---|---|---|
| Isobornyl acrylate | 10.00 | | |
| Isobornyl methacrylate | — | 9.68 | 9.14 |
| N,N-Dimethyl acrylamide | 19.90 | — | |
| Tetrahydrofurfural acrylate | 10.00 | — | |
| β-Carboxyethyl acrylate | 10.30 | — | |
| Adhesion promoters | | | |
| Acrylic acid | — | 2.40 | 2.40 |
| glycidoxypropyltrimethoxysilane | 2.00 | — | |
| Photoinitiators | | | |
| TPO | 1.50 | 1.50 | 1.50 |
| Benzoyl cyclohexanol | 1.50 | 1.20 | 1.50 |
| Anaerobic Curing agents | | | |
| o-Benzoic Sulfimide | — | — | 0.45 |
| 1-acetyl-2-phenyl hydrazine | — | — | 0.45 |
| Cumene hydroperoxide | — | — | 0.94 |
| Chelator solutions | 0.10 | 0.21 | 0.18 |

The adhesive formulations were used to produce 1 foot (30.5 cm) long bonded wiper blade assemblies as shown in FIG. 1. The adhesive was applied to the support member substrate, the polyurethane substrate was lightly ground to remove a mold release previously identified on the surface and then overlapingly joined, as shown, and the adhesive was cured by irradiating for 30 seconds through the polyurethane substrate using a Loctite Fusion UV chamber equipped with a "D" mercury arc bulb as UV source. The UV source provided an intensity at the substrate of 129 mW/cm² UVA, 92 mW/cm² UVB and 11 mW/cm² UVC. The assemblies were sufficiently bonded at this time to withstand normal handling. The assemblies were held under ambient humidity, room light and and temperature conditions for a period of at least 24 hrs and then 90° peel strengths were determined at 2 inches/min (5.08 cm/min). Physical properties of the adhesive formulations and peel strength test results are shown in Table

TABLE 2

| Formulation | A | B | 1 |
|---|---|---|---|
| Viscosity @ 25° C. (mPa.s) | | 4000–5000 | 2,032 |
| Stability @ 82° C. | | min. 6 hr | min. 6 hr |
| Appearance | colorless | | amber |
| Peel Strength, lbf | 6.80 | 10.56 | 32.88 |

The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims.

All published documents and all copending applications mentioned anywhere herein are expressly incorporated here by reference in their entirety. The full scope of the invention is measured by the claim.

What is claimed is:

1. A method of preparing a bonded assembly of a support substrate and a flexible plastic substrate wherein the bonded assembly, in use, is subjected to peel stresses, at least one of the substrates being transparent or translucent to UV or visible light, the method comprising
   a) applying, to at least one of the substrates, a photo/anaerobic dual cure composition comprising:
      i) at least one (meth)acrylate-capped urethane oligomer,
      ii) at least one diluent (meth)acrylate monomer,
      iii) an anaerobic curing system, and
      iv) a free-radical photoinitiator;
   b) joining the two substrates
   c) irradiating the adhesive through said transparent or translucent substrate with light of a wavelength effective to activate the photoinitiator for a time sufficient to at least fixture the adhesive, and then
   d) allowing the assembly to further cure at ambient conditions without for at least 12 hrs without subjecting the fixtured assembly to substantial peel stresses.

2. A method as in claim 1 wherein the bonded assembly is a wiper blade assembly comprising a support member and a flexible plastic wiper blade which is transparent or translucent to UV or visible light.

3. A method as in claim 2 wherein the wiper blade is formed of a polyurethane material and the support member is formed of a coated steel.

4. A method as in claim 1 wherein the (meth)acrylate-capped urethane oligomer comprises a block resin having at least one polyether block derived from a polyether polyol and at least one hard block derived from an aromatic or cycloaliphatic diisocyanate and an aromatic or cycloaliphatic polyol.

5. A method as in claim 4 wherein said polyether polyol is an aliphatic polyether having a number average molecular weight of from about 400 to about 10,000.

6. A method as in claim 1 wherein the at least one (meth)acrylate capped polyurethane oligomer is employed in the compositions in an amount of from about 25 to about 80% by weight of the composition.

7. A method as in claim 1 wherein the at least one diluent (meth)acrylate monomer is a member selected from the group consisting of β-carboxyethyl acrylate, isobornyl acrylate, n-octyl acrylate, n-decyl acrylate, cycloheryl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl acrylate, isooctyl acrylate, n-butyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, phenoxyethyl acrylate, hydroxyethyl methacrylate, hydroxypropyl methacrylate, cyclohexyl methacrylate, glycerol mono-methacrylate, glycerol 1,3-dimethacrylate, trimethyl cyclohexyl methacrylate, methyl triglycol methacrylate, isobornyl methacrylate trimethylolpropane trimethacrylate, neopentyl glycol dimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, and a mixture of two or more thereof.

8. A method as in claim 1 wherein the at least one diluent (meth)acrylate monomer is a mixture of liquid ester monomers having a viscosity of 100–5,000 cps (100–5,000 mPa·s).

9. A method as in claim 1 wherein the at least one diluent (meth)acrylate monomer comprises a hydroxyalkyl (meth)acrylate.

10. A method as in claim 1 wherein the at least one diluent (meth)acrylate monomer is present in the composition in an amount of from about 10% to about 60% by weight of the composition.

11. A method as in claim 1 wherein the composition further comprises an adhesion promoter.

12. A bonded assembly produced by the method of claim 1.

13. A bonded assembly as in claim 12 wherein the bonded assembly is a wiper blade assembly comprising a support member and a flexible plastic wiper blade which is transparent or translucent to UV or visible light.

14. A bonded assembly as in claim 13 wherein the wiper blade is formed of a polyurethane material and the support member is formed of a coated steel.

15. A bonded assembly as in claim 14 wherein the (meth)acrylate-capped urethane oligomer comprises a block resin having at least one polyether block derived from a polyether polyol and at least one hard block derived from an aromatic or cycloaliphatic diisocyanate and an aromatic or cycloaliphatic polyol.

16. A bonded assembly as in claim 15 wherein the at least one diluent (meth)acrylate monomer comprises a hydroxyalkyl (meth)acrylate.

17. A bonded assembly which, when in normal use, is subjected to peel stresses, wherein
   the bonded assembly comprises a support substrate and a flexible plastic substrate, at least one of which substrates is transparent or translucent to UV or visible light, and
   said substrates are bonded to each other by a cured photo/anaerobic dual cure adhesive composition comprising
      i) at least one (meth)acrylate-capped urethane oligomer,
      ii) at least one diluent (meth)acrylate monomer,
      iii) an anaerobic curing system, and
      iv) a free-radical photoinitiator.

18. A bonded assembly as in claim 17 wherein the (meth)acrylate capped urethane oligomer comprises a block resin having at least one polyether block derived from a polyether polyol and at least one hard block derived from an aromatic or cycloaliphatic diisocyanate and an aromatic or cycloaliphatic polyol.

19. A bonded assembly as in claim 18 wherein the at least one diluent (meth)acrylate monomer comprises a hydroxyalkyl (meth)acrylate.

20. A bonded assembly as in claim 19 further comprising an adhesion promoter.

21. A bonded assembly as in claim 17 wherein the flexible plastic substrate is a wiper blade member.

22. A bonded assembly as in claim 17 wherein the flexible plastic substrate is formed of a polyurethane material.

23. A bonded assembly as in claim 22 wherein the flexible plastic substrate transparent or translucent to UV or visible light.

24. A method of preparing a bonded assembly of two substrates at least one of which is transparent or translucent to UV or visible light, the method comprising
   a) applying, to at least one of the substrates, a photo/anaerobic dual cure composition comprising:
      i) at least one (meth)acrylate-capped urethane oligomer,
      ii) at least one diluent (meth)acrylate monomer,
      iii) an anaerobic curing system and
      iv) a free-radical photoinitiator;

b) joining the two substrates
c) irradiating the adhesive through said transparent or translucent substrate with light of a wavelength effective to activate the photoinitiator for a lime sufficient to at least fixture the adhesive, and then
d) allowing the assembly to further cure at ambient conditions without for at least 12 hrs without subjecting the fixtured assembly to substantial peel stresses, wherein the bonded assembly is a wiper blade assembly comprising a support member and a flexible plastic wiper blade which is transparent or translucent to UV or visible light.

* * * * *

UNITED STATES PATENT AND TRADEMARK OFFICE
CERTIFICATE OF CORRECTION

PATENT NO. : 6,676,795 B1
DATED : January 13, 2004
INVENTOR(S) : Susan Levandoski It is certified that error appears in the above-identified patent and that said Letters Patent is hereby corrected as shown below:

Column 3,
Line 16, change "isobomyl" to -- isobornyl --

Column 5,
Line 34, change "isobomyl" to -- isobornyl --
Line 58, change "Componentsfformulations" to -- Components/Formulations --

Column 6,
Line 3, change "Componentsfformulations" to -- Components/Formulations --

Column 7,
Line 57, change "isobomyl" to -- isobornyl --

Signed and Sealed this

Twenty-seventh Day of July, 2004

JON W. DUDAS
*Acting Director of the United States Patent and Trademark Office*